United States Patent
Lee et al.

(10) Patent No.: US 12,508,861 B2
(45) Date of Patent: Dec. 30, 2025

(54) SUSPENSION APPARATUS AND METHOD OF CONTROLLING THE SAME

(71) Applicant: HYUNDAI MOBIS CO., LTD., Seoul (KR)

(72) Inventors: Min Sub Lee, Yongin-si (KR); Jin Su Pyeon, Yongin-si (KR); Sang Mu Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/047,842

(22) Filed: Feb. 7, 2025

(65) Prior Publication Data

US 2025/0381817 A1   Dec. 18, 2025

(30) Foreign Application Priority Data

Jun. 13, 2024   (KR) .................. 10-2024-0076979
Jun. 13, 2024   (KR) .................. 10-2024-0076980
Jun. 13, 2024   (KR) .................. 10-2024-0076981

(51) Int. Cl.
  *B60G 17/016*   (2006.01)
  *B60G 17/06*   (2006.01)

(52) U.S. Cl.
  CPC ........... *B60G 17/016* (2013.01); *B60G 17/06* (2013.01); *B60G 2200/18* (2013.01); *B60G 2202/24* (2013.01); *B60G 2202/42* (2013.01); *B60G 2500/30* (2013.01); *B60G 2600/182* (2013.01)

(58) Field of Classification Search
  CPC .. B60G 17/016; B60G 17/06; B60G 2200/18; B60G 2202/24; B60G 2202/42; B60G 2500/30; B60G 2600/182
  See application file for complete search history.

(56) References Cited

U.S. PATENT DOCUMENTS

| | | | |
|---|---|---|---|
| 11,987,090 B1 * | 5/2024 | Theisen | B60G 17/0165 |
| 12,168,378 B2 * | 12/2024 | Calchand | G01M 17/04 |
| 12,179,539 B2 * | 12/2024 | Anderson | B60G 17/015 |
| 2014/0067155 A1 * | 3/2014 | Yu | B60W 40/13 701/1 |
| 2015/0224845 A1 * | 8/2015 | Anderson | B60G 17/052 701/37 |
| 2020/0262500 A1 * | 8/2020 | Hara | B60L 50/66 |
| 2020/0317018 A1 * | 10/2020 | Nong | G05D 1/027 |
| 2020/0406699 A1 * | 12/2020 | Yamahata | B60G 17/01908 |
| 2024/0300275 A1 * | 9/2024 | Anderson | H02K 7/14 |

FOREIGN PATENT DOCUMENTS

KR   10-2061154 B1   12/2019

* cited by examiner

*Primary Examiner* — Toan C To
(74) *Attorney, Agent, or Firm* — Morgan, Lewis & Bockius LLP

(57) ABSTRACT

A suspension apparatus includes a frame, a first carrier and a second carrier connected to the frame and movable with respect to the frame, a first damper disposed in the frame and driven in response to the movement of the first carrier, a second damper disposed in the frame and driven in response to the movement of the second carrier, and a controller configured to control the operation of the first damper and the second damper so that a difference between the height of the first carrier and the height of the second carrier with respect to the frame is maintained within a predetermined range.

18 Claims, 7 Drawing Sheets

SUSPENSION APPARATUS AND METHOD OF CONTROLLING THE SAME

CROSS-REFERENCE TO RELATED APPLICATIONS

This application claims priority from and the benefit of Korean Patent Application Nos. 10-2024-0076979, 10-2024-0076980, and 10-2024-0076981, filed on Jun. 13, 2024, which are hereby incorporated by reference for all purposes as if set forth herein.

BACKGROUND

Field

Exemplary embodiments of the present disclosure relate to a suspension apparatus and a method of controlling the same, and more particularly, to a suspension apparatus including an electric damper and a method of controlling the same.

Discussion of the Background

An electric damper is connected to the arm or link of a suspension apparatus, and generates attenuation torque that reduces an up and down movement of a wheel, which occurs due to a road shock. The electric damper may be applied to four wheels and independently generate damping forces.

The Background technology of the present disclosure is disclosed in Korean Patent No. 10-2061154 (Dec. 24, 2019 entitled "Rotary damper for vehicle").

SUMMARY

Various embodiments are directed to providing a suspension apparatus including a damper that implements a shock absorber function and a stabilizer function and a method of controlling the same.

Furthermore, various embodiments are directed to providing a suspension apparatus including a damper that performs the shock absorber function and that detects the height of a vehicle and a method of controlling the same.

In an embodiment, a suspension apparatus may include a frame, a first carrier and a second carrier, each connected to the frame and movable with respect to the frame, a first damper disposed in the frame and driven in response to the movement of the first carrier, a second damper disposed in the frame and driven in response to the movement of the second carrier, and a controller configured to control the driving of the first damper and the second damper so that a difference between the height of the first carrier and the height of the second carrier with respect to the frame is maintained within a predetermined range.

The suspension apparatus may further include a high voltage battery configured to supply power to the controller, the first damper, and the second damper and a low voltage battery configured to supply power to the controller. A voltage of the high voltage battery is greater than a voltage of the low voltage battery.

The controller may include a first inverter configured to adjust the power that is supplied to the first damper, a second inverter configured to adjust the power that is supplied to the second damper, and a processor configured to control the operation of the first inverter and the second inverter.

The controller may include a first inverter configured to adjust the power that is supplied to the first damper and a second inverter configured to adjust the power that is supplied to the second damper. The first inverter may control the operation of the second inverter.

The first damper may include a first electric damper configured to be driven so that the first carrier is moved and a first encoder configured to detect information on the first electric damper. The second damper may include a second electric damper configured to be driven so that the second carrier is moved and a second encoder configured to detect information on the second electric damper.

The controller may control the driving of the first damper and the second damper based on the information that is detected by the first encoder and the second encoder.

The controller may control each of the first damper and the second damper to generate rotational power in a direction opposite to a movement direction of each of the first carrier and the second carrier.

The controller may control the first damper and the second damper to be independently driven.

In an embodiment, a method of controlling a suspension apparatus that controls the driving of a damper through a controller may include a damper information reception step of receiving information of a first damper and a second damper, a controller calculation step of calculating control values for the first damper and the second damper based on the received information, a signal transmission step of transmitting the control values to the first damper and the second damper, and a damper operation step of operating the first damper and the second damper based on the control values.

The information may include signals relating to a rotation angle of the first damper and a rotation angle of the second damper.

In an embodiment, a suspension apparatus may include a frame, a first carrier connected to the frame and movable with respect to the frame, a first damper disposed in the frame and driven in response to the movement of the first carrier, a controller configured to receive information on a relative location of the first carrier with respect to the frame from the first damper, and a low voltage battery configured to supply power to the first damper through the controller.

The controller may include a processor configured to be powered by the low voltage battery and a first inverter configured to be powered by the low voltage battery and to supply the power to the first damper.

The first inverter may receive the information from the first damper and transmits the information to the processor. The processor may calculate the height of a vehicle in order to estimate the height based on the information.

The controller may include a first inverter configured to be powered by the low voltage battery and to supply the power to the first damper.

The first inverter may receive the information from the first damper and calculate the height of a vehicle in order to estimate the height based on the information.

The first damper may include a first electric damper configured to be driven so that the first carrier is moved and a first encoder configured to detect the information on the first electric damper.

The suspension apparatus may further include a second carrier connected to the frame and movable with respect to the frame and a second damper disposed in the frame and driven in response to the movement of the second carrier. The controller may receive information on a relative location of the second carrier with respect to the frame from the second damper. The low voltage battery may supply the power to the first damper through the controller.

The controller may calculate a form in which a vehicle has been disposed in order to estimate the form, based on the information that is received from the first damper and the second damper.

The suspension apparatus may further include a high voltage battery configured to supply power to the first damper and the second damper through the controller. A voltage of the high voltage battery is greater than a voltage of the low voltage battery. The controller may control the first damper and the second damper to be independently driven.

In an embodiment, a method of controlling a suspension apparatus that controls the driving of a damper through a controller may include a damper information reception step of receiving information of a damper and a vehicle height estimation step of calculating the height of a vehicle in order to estimate the height based on the received information on the damper.

In an embodiment, a suspension apparatus may include a frame, a first carrier and a second carrier, each connected to the frame and movable with respect to the frame, a first damper disposed in the frame and driven in response to the movement of the first carrier, a second damper disposed in the frame and driven in response to the movement of the second carrier, a controller configured to receive information on a relative location of each of the first carrier and the second carrier with respect to the frame from each of the first damper and the second damper, and a low voltage battery configured to supply power to the first damper and the second damper through the controller.

The controller may control the driving of the first damper and the driving of the second damper so that a difference between the height of the first carrier and the height of the second carrier with respect to the frame is maintained within a predetermined range.

The suspension apparatus may further include a high voltage battery configured to supply power to the first damper and the second damper through the controller. A voltage of the high voltage battery is greater than a voltage of the low voltage battery.

The controller may control the first damper and the second damper to be independently driven.

The first damper may include a first electric damper configured to be driven so that the first carrier is moved and a first encoder configured to detect information on the first electric damper. The second damper may include a second electric damper configured to be driven so that the second carrier is moved and a second encoder configured to detect information on the second electric damper.

The controller may include a first inverter configured to adjust the power that is supplied to the first damper, a second inverter configured to adjust the power that is supplied to the second damper, and a processor configured to control the operation of the first inverter and the second inverter.

The first inverter may receive the information from the first damper and transmit the information to the processor. The processor may calculate the height of the vehicle in order to estimate the height based on the information.

The controller may include a first inverter configured to adjust the power that is supplied to the first damper and a second inverter configured to adjust the power that is supplied to the second damper. The first inverter may control the operation of the second inverter.

The first inverter may receive the information from the first damper, and may calculate the height of a vehicle in order to estimate the height based on the information.

The controller may calculate a form in which the vehicle has been disposed in order to estimate the form, based on the information that is received from the first damper and the second damper.

The shock absorber function and the stabilizer function can be implemented through the suspension apparatus and the method of controlling the same according to the embodiments of the present disclosure.

Furthermore, the shock absorber function can be implemented and the height of a vehicle can be detected through the suspension apparatus and the method of controlling the same according to the embodiments of the present disclosure.

DETAILED DESCRIPTION OF THE ILLUSTRATED EMBODIMENTS

Figure 1:
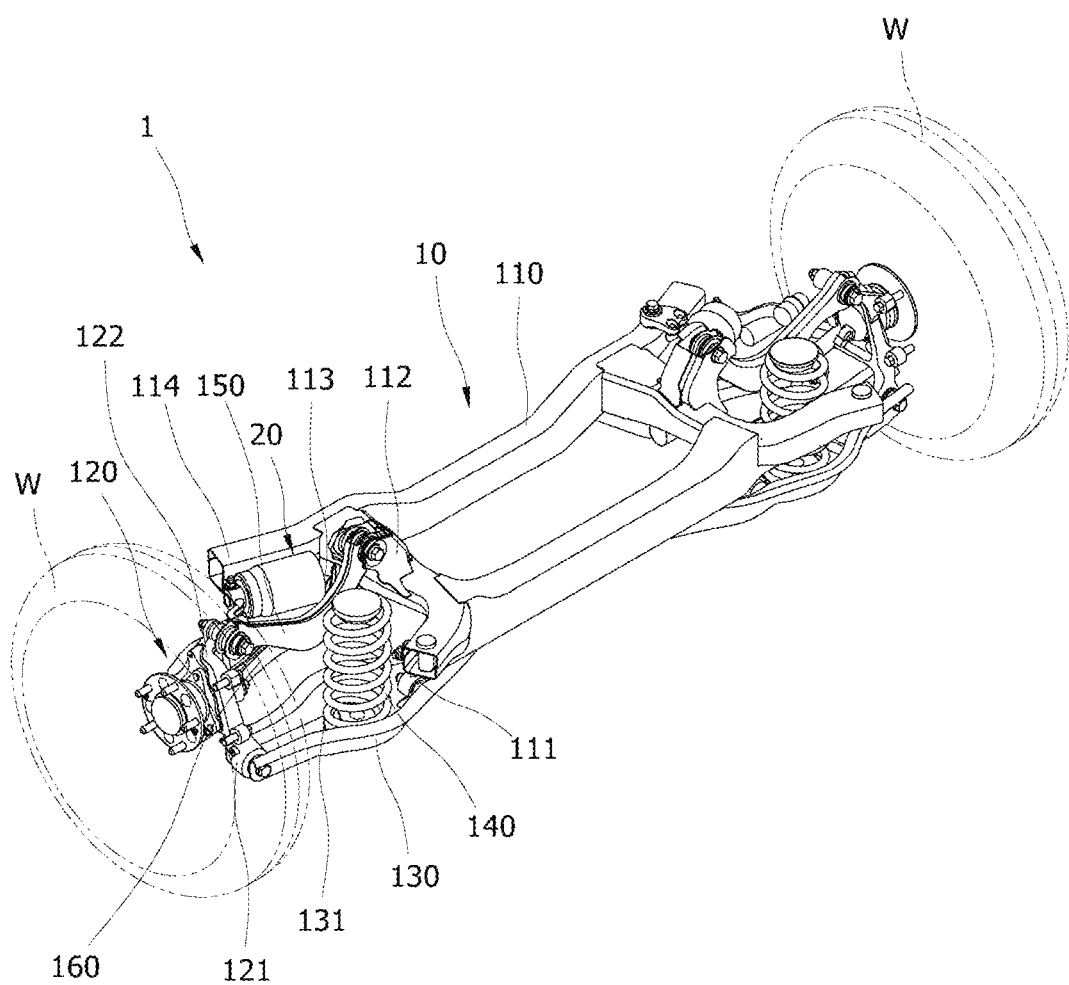
FIG. 1 is a perspective view of a schematic construction of a suspension apparatus according to an embodiment of the present disclosure, which is viewed at a first time point.

Hereinafter, a suspension apparatus and a method of controlling the same according to embodiments of the present disclosure are described with reference to the accompanying drawings. In this process, the thicknesses of lines or the sizes of components illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

Figure 2:
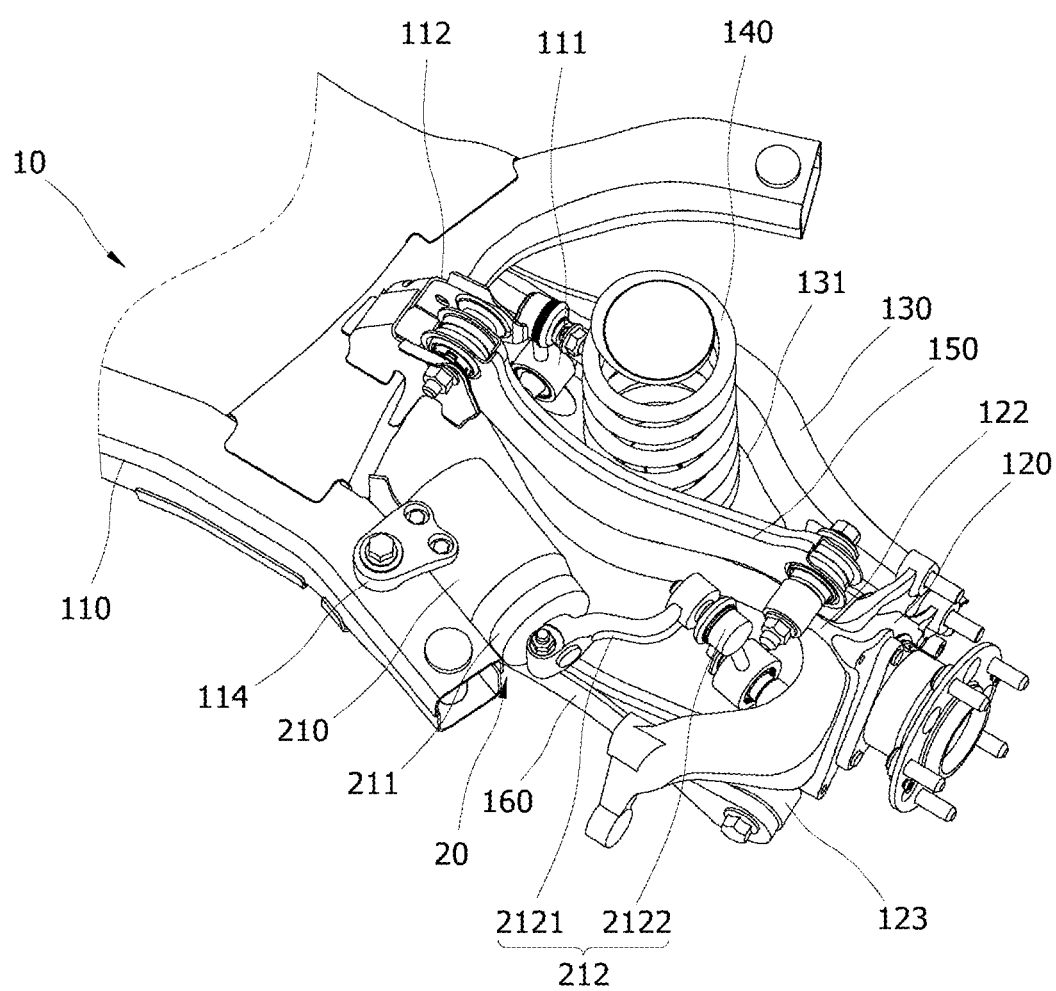
FIG. 2 is a perspective view of a schematic construction of some components of the suspension apparatus according to an embodiment of the present disclosure, which is viewed at a second time point.
Figure 3:
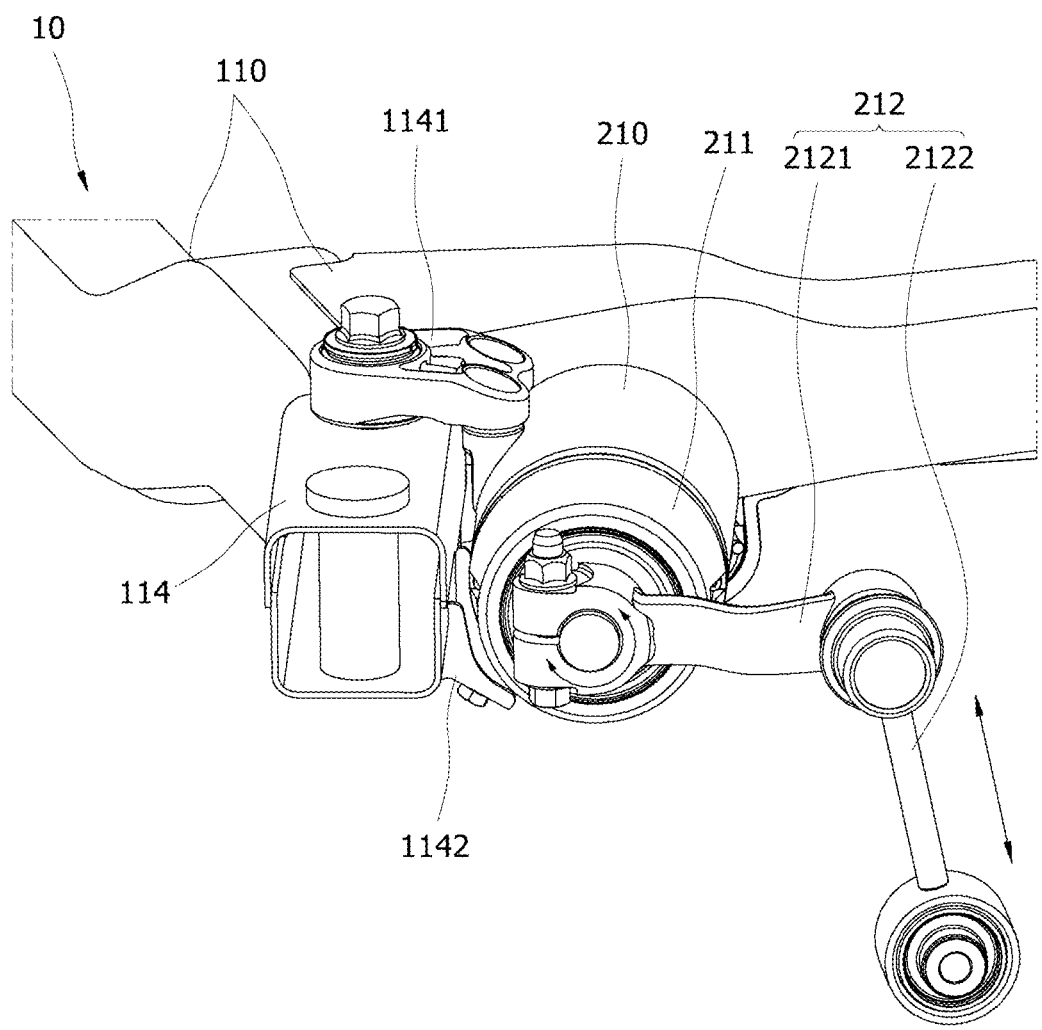
FIG. 3 is a perspective view of a schematic construction of some components of the suspension apparatus according to an embodiment of the present disclosure, which is viewed at a third time point.
Figure 4:
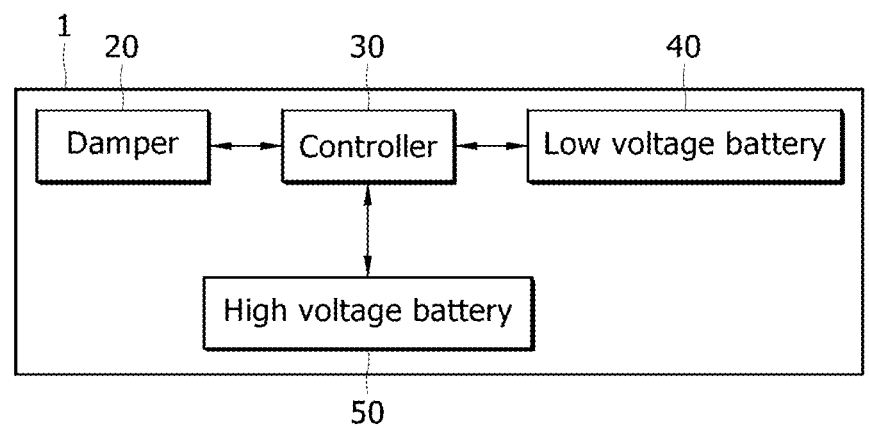
FIG. 4 is a block diagram of the suspension apparatus according to an embodiment of the present disclosure.
Figure 5:
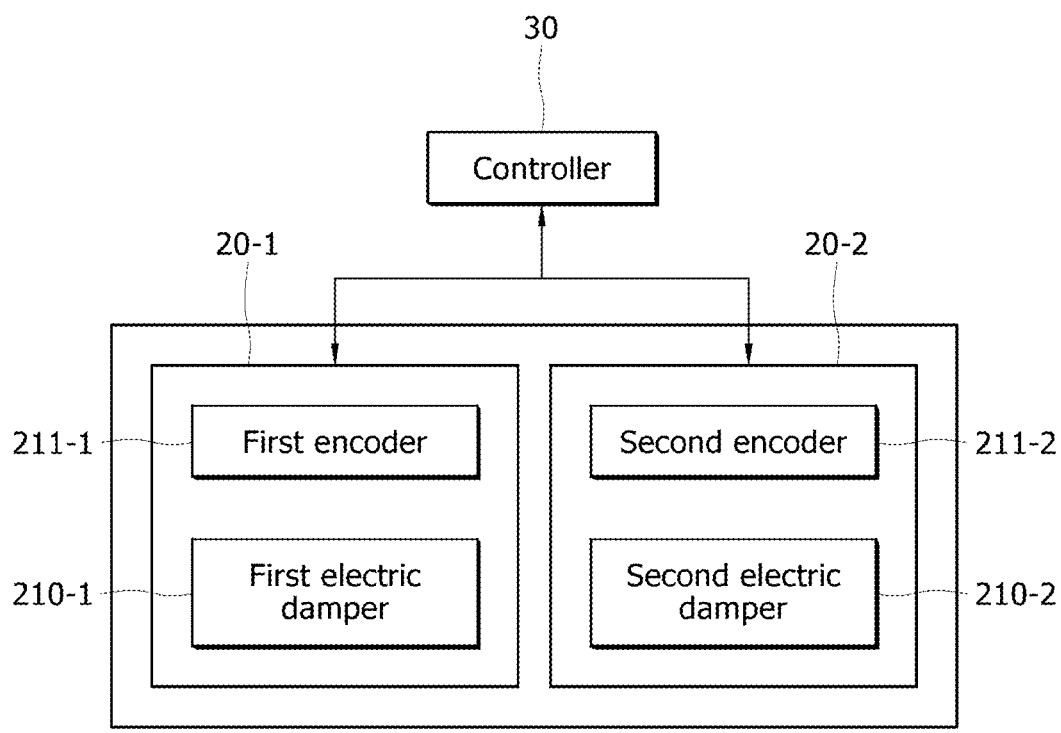
FIG. 5 is a block diagram of an embodiment of a damper of the suspension apparatus according to an embodiment of the present disclosure.

FIG. 1 is a perspective view of a schematic construction of a suspension apparatus according to an embodiment of the present disclosure, which is viewed at a first time point. FIG. 2 is a perspective view of a schematic construction of some components of the suspension apparatus according to an embodiment of the present disclosure, which is viewed at a second time point. FIG. 3 is a perspective view of a schematic construction of some components of the suspension apparatus according to an embodiment of the present disclosure, which is viewed at a third time point. FIG. 4 is a block diagram of the suspension apparatus according to an embodiment of the present disclosure. FIG. 5 is a block diagram of an embodiment of a damper of the suspension apparatus according to an embodiment of the present disclosure.

Referring to FIGS. 1 to 5, a suspension apparatus 1 may include a vehicle body 10, a damper 20, a controller 30, and a low voltage battery 40. The suspension apparatus 1 may further include a high voltage battery 50. Although the controller 30, the low voltage battery 40, and the high voltage battery 50 are not illustrated in FIGS. 1 to 3, referring to the block diagram of FIG. 4, the suspension apparatus 1 includes the controller 30, the low voltage battery 40, and the high voltage battery 50, and may be disposed in a vehicle. The locations at which the controller 30, the low voltage battery 40, and the high voltage battery 50 are disposed are not limited.

As illustrated in FIG. 5, the damper 20 may include a plurality of dampers 20. According to an embodiment, the damper 20 may include a first damper 20-1 and a second damper 20-2.

The damper 20 may be disposed in the vehicle body 10. The damper 20 may be controlled by the controller 30. Information on the state and/or location of the damper 20 may be transmitted to the controller 30. The controller 30 may control the driving of the damper 20.

The low voltage battery 40 may supply power to the damper 20 and/or the controller 30. The low voltage battery 40 may supply power that is necessary for the driving of the damper 20 and/or the controller 30. When the low voltage battery 40 supplies power to the damper 20 and the controller 30, the damper 20 and the controller 30 may exchange signals. The low voltage battery 40 may supply power to the damper 20 and the controller 30 even in the state in which a vehicle has been turned off. Accordingly, the damper 20 and the controller 30 may exchange signals even in the state in which the vehicle has been turned off.

The high voltage battery 50 may supply power to the damper 20 and/or the controller 30. The power that is supplied from the high voltage battery 50 to the controller 30 may be supplied to the damper 20 that is connected to the controller 30. The high voltage battery 50 may supply power that is necessary for the driving of the damper 20 and/or the controller 30.

The voltage of the high voltage battery 50 is greater than the voltage of the low voltage battery 40.

The suspension apparatus 1 may include a frame 110, a plurality of carriers 120 connected to the frame 110, a plurality of lower arms 130 connected to the frame 110, a spring 140 connected to each of the plurality of lower arms 130, a plurality of first links 150 connected to the frame 110, a plurality of second links 160 connected to the frame 110, and the plurality of dampers 20 connected to the plurality of carriers 120, respectively.

The vehicle body 10 may include the frame 110, the carrier 120, the lower arm 130, the spring 140, the first link 150, and the second link 160.

The vehicle body 10 that is described hereinafter may refer to various structures that form the structural framework of a vehicle, such as a frame body, a sub frame, and a body shell. Hereinafter, an example in which the length direction of the vehicle body 10 refers to a direction parallel to the progress direction of a wheel W on the basis of FIG. 1 and the width direction of the vehicle body 10 refers to a direction parallel to the central axis of two wheels W on the basis of FIG. 1 is described.

Furthermore, the wheel W that is described hereinafter may refer to a front wheel of a vehicle. The wheel W is not limited to a front wheel of a vehicle, and may refer to a rear wheel of a vehicle. Accordingly, the suspension apparatus 1 according to an embodiment of the present disclosure may be applied to both a front wheel of a vehicle and a rear wheel of the vehicle. The central axis of the wheel W may be disposed in parallel to the width direction of the vehicle body 10.

The frame 110 may refer to a structure that is disposed between two wheels W. The carrier 120, the lower arm 130, the spring 140, the first link 150, and the second link 160 may be disposed in the frame 110.

The frame 110 may include a frame lower-arm connection part 111, a frame first-link connection part 112, a frame second-link connection part 113, and a frame damper connection part 114.

The frame lower-arm connection part 111 is disposed in the frame 110, and may connect the frame 110 and the lower arm 130. According to an embodiment, the frame lower-arm connection part 111 may be disposed under the frame 110. The frame 110 and the lower arm 130 may be movable with respect to each other. According to an embodiment, the frame 110 and the lower arm 130 may be rotated with respect to each other.

The frame first-link connection part 112 is disposed in the frame 110, and may connect the frame 110 and the first link 150. According to an embodiment, the frame first-link connection part 112 may be disposed on an upper part or lateral part of the frame 110. The frame 110 and the first link 150 may be movable with respect to each other. According to an embodiment, the frame 110 and the first link 150 may be rotated with respect to each other.

The frame second-link connection part 113 is disposed in the frame 110, and may connect the frame 110 and the second link 160. According to an embodiment, the frame second-link connection part 113 may be disposed under the frame 110. The frame 110 and the frame second-link connection part 113 may be movable with respect to each other. According to an embodiment, the frame 110 and the frame second-link connection part 113 may be rotated with respect to each other.

The frame damper connection part 114 is disposed in the frame 110, and may connect the frame 110 and the damper 20. Accordingly, the damper 20 is connected to the frame damper connection part 114 and may be fixed to the frame 110.

The frame damper connection part 114 may include a frame damper upper-connection part 1141 and a frame damper lower-connection part 1142. The frame damper upper-connection part 1141 may be disposed above the frame damper lower-connection part 1142. The frame damper upper-connection part 1141 may be connected to an upper part of the damper 20. The frame damper lower-connection part 1142 may be connected to a lower part of the damper 20. Accordingly, the damper 20 may be fixed to the frame 110.

The carrier 120 may be disposed by being spaced apart from the frame 110. The carrier 120 may be connected to the frame 110 by the lower arm 130, the first link 150, the second link 160. The carrier 120 is connected to the lower arm 130, the first link 150, and the second link 160, and may be moved with respect to the frame 110. According to an embodiment, the carrier 120 may be moved up and down.

The carriers 120 may be connected to the wheels W that are rotatably installed on both sides of the frame 110, respectively. The carrier 120 may function as a component that provides a mechanical connection to various suspension parts between the vehicle body 10 and the wheel W.

The carrier 120 may be provided in plurality. The carrier 120 may be provided in pairs. The pair of carriers 120 may be individually connected to a pair of wheels W that is disposed to face each other in the width direction of the vehicle body 10. The carrier 120 may be prepared in pairs in a front wheel of a vehicle, and may be provided in pairs in a rear wheel of a vehicle.

The carrier 120 may include a carrier lower-arm connection part 121, a carrier first-link connection part 122, and a carrier second-link connection part 123.

The carrier lower-arm connection part 121 is disposed in the carrier 120, and may connect the carrier 120 and the lower arm 130. According to an embodiment, the carrier lower-arm connection part 121 may be disposed under the carrier 120. The carrier 120 and the lower arm 130 may be movable with respect to each other. According to an embodiment, the carrier 120 and the lower arm 130 may be rotated with respect to each other.

The carrier first-link connection part 122 is disposed in the carrier 120, and may connect the carrier 120 and the lower arm 130. According to an embodiment, the carrier first-link connection part 122 may be disposed above the carrier 120. The carrier 120 and the lower arm 130 may be movable with respect to each other. According to an embodiment, the carrier 120 and the lower arm 130 may be rotated with respect to each other.

The carrier second-link connection part 123 is disposed in the carrier 120, and may connect the carrier 120 and the lower arm 130. According to an embodiment, the carrier second-link connection part 123 may be disposed under the carrier 120. The carrier 120 and the lower arm 130 may be movable with respect to each other. According to an embodiment, the carrier 120 and the lower arm 130 may be rotated with respect to each other.

The carrier 120 may be connected to the damper 20. According to an embodiment, the carrier 120 may be connected to a damper link part 212 of the damper 20. The damper link part 212 may be rotated in response to the driving of the damper 20, and may be moved by being connected to the carrier 120.

According to an embodiment, the damper link part 212 may be moved (or rotated) in response to a movement of the carrier 120. The damper 20 may be driven in response to a movement (or rotation) of the damper link part 212.

According to another embodiment, the damper link part 212 may be moved (or rotated) in response to the driving of the damper 20. The carrier 120 may be driven in response to a movement (or rotation) of the damper link part 212.

The electric damper 210 of the damper 20 may be connected to a first damper link 2121 of the damper link part 212. The first damper link 2121 may be connected to a second damper link 2122 of the damper link part 212. The second damper link 2122 may be connected to the carrier 120.

The lower arm 130 may be connected to the frame lower-arm connection part 111 of the frame 110 and the carrier lower-arm connection part 121 of the carrier 120.

The lower arm 130 may include a seated groove 131 in which the spring 140 is seated. An elastic force that is generated by the spring 140 that supports the vehicle body 10 may be transmitted to the ground through the lower arm 130, the carrier 120, and the wheel W.

The seated groove 131 may be formed to have a form of a groove that is concavely depressed and formed downward from the top of the lower arm 130. The seated groove 131 may be disposed in the lower arm 130. The seated groove 131 may have an approximately circular cross section.

The spring 140 may be disposed between the carrier 120 and the vehicle body 10. According to an embodiment, the spring 140 may connect the lower arm 130 and the vehicle body 10. The spring 140 may be provided in a way to be elastically deformable. The spring 140 may function as a component that maintains the ground state of the wheel W by generating weight in a direction opposite to a movement of the wheel W by its elastic deformation when the bump of the wheel W behaves and that absorbs a shock that is input from a road surface.

The spring 140 may be formed to have a form of a coil spring that is retractible in a length direction thereof. The bottom of the spring 140 is inserted into the seated groove 131, and may be fixed to the bottom surface of the seated groove 131.

The length direction of the spring 140 may be perpendicular to the ground, but is not limited thereto. The spring 140 may be disposed slantly at a predetermined angle to the ground within a range in which the spring 140 can generate an elastic restoring force downward when the bump of the wheel W behaves.

The lower arm 130, the first link 150, and the second link 160 may restrict a path along which the carrier 120 moves.

The damper 20 may include an electric damper 210, an encoder 211, and the damper link part 212.

The damper 20 may be provided in plurality. According to an embodiment, the damper 20 may include the first damper 20-1 and the second damper 20-2. The first damper 20-1 and the second damper 20-2 may refer to the dampers 20 that are disposed in the front wheels of a vehicle or may refer to the dampers 20 that are disposed in the rear wheels of a vehicle. Alternatively, the first damper 20-1 may refer to the damper 20 that is disposed in a front wheel of a vehicle. The second damper 20-2 may refer to the damper 20 that is disposed in a rear wheel of a vehicle.

The first damper 20-1 may include a first electric damper 210-1 and a first encoder 211-1. The second damper 20-2 may include a second electric damper 210-2 and a second encoder 211-2.

A detailed shape of the damper 20 is not limited to shapes illustrated in FIGS. 1 to 3, and the damper 20 may be implemented in various shapes.

The electric damper 210 may generate rotational power by being supplied with power from the controller 30, the low voltage battery 40, and/or the high voltage battery 50. The electric damper 210 may be implemented with an AC, DC, or BLDC motor. The electric damper 210 is a component that converts power supplied by the controller 30 or the high voltage battery 50 into rotatory power, and may generate the rotational power in a direction opposite to the movement direction of the carrier 120 or the movement direction of the damper link part 212. The electric damper 210 may be prepared as a rotary damper.

As described above, as the electric damper 210 generates the rotational power in a direction opposite to the movement direction of the carrier 120 or the movement direction of the damper link part 212, the damper 20 may perform the function of a hydraulic damper, such as a shock absorber. For example, the damper 20 may generate a damping force. The damping force of the damper 20 may be changed by the controller 30 that controls the electric damper 210.

The controller 30 may differently control the damping forces of the plurality of dampers 20. The controller 30 may differently control the damping force of only one of the plurality of dampers 20. According to an embodiment, the controller 30 may differently control the damping force of the first damper 20-1 and the damping force of the second damper 20-2.

Furthermore, the controller 30 may adjust the damping force of the damper 20 in real time.

Furthermore, the controller 30 may adjust the height of a vehicle (e.g., a vehicle height) by controlling the electric damper 210 of the damper 20 to operate.

Moreover, the controller 30 may calculate the height of the vehicle based on a signal that is received through the encoder 211 of the damper 20. The controller 30 may calculate the height of the vehicle based on signals that are received through the encoders 211 of the plurality of dampers 20.

Furthermore, the controller 30 may estimate a form (e.g., a slope, a paved road, or an unpaved road) of a terrain in which a vehicle is disposed, based on signals that are received through the encoders 211 of the plurality of dampers 20.

The electric damper 210 may be driven under the control of the controller 30. The controller 30 may control the rotational speed and/or rotation angle of the electric damper 210.

The electric damper 210 may include a motor and a decelerator. The motor and the decelerator may be connected. The decelerator may be connected to the damper link part 212. The decelerator may be prepared as a planet gear in which multiple gears are engaged with each other. In the electric damper 210, rotational power of the motor may be changed by the decelerator, and thus rotational power may be transmitted to the damper link part 212. The damper link part 212 may be moved (or rotated) by the rotation of the motor.

The encoder 211 may detect a rotational speed or rotation angle of the electric damper 210, a variance of the rotational speed and/or a variance of the rotation angle. The encoder 211 may be prepared as a magnetoresistive (MR) sensor that detects the rotational speed or rotation angle of the electric damper 210, the variance of the rotational speed and/or the variance of the rotation angle.

The encoder 211 is electrically connected to the controller 30. The controller 30 is electrically connected to the electric damper 210, and may control an operation of the electric damper 210 based on a signal that is detected by the encoder 211. The signal that is detected by the encoder 211 may include a rotational speed or rotation angle of the electric damper 210, a variance of the rotational speed and/or a variance of the rotation angle.

Information on the location of the carrier 120 with respect to the frame 110 may be estimated based on signals for a rotational speed, a rotation angle, a variance of the rotational speed and/or a variance of the rotation angle, which are detected by the encoder 211. The information on the location of the carrier 120 with respect to the frame 110 may be estimated by the encoder 211, the damper 20, or the controller 30.

The damper link part 212 may be coupled to the electric damper 210 and the carrier 120. The damper link part 212 may perform a role of changing vibration or a movement of the carrier 120 into a rotary motion of the motor of the electric damper 210. The damper link part 212 is rotatably coupled to the electric damper 210, and may rotate the motor of the electric damper 210.

The damper link part 212 may include the first damper link 2121 and the second damper link 2122. The first damper link 2121 may be connected to the electric damper 210 and the second damper link 2122. The second damper link 2122 may be connected to the first damper link 2121 and the carrier 120.

The first damper link 2121 may be rotated with respect to the electric damper 210 in response to the driving of the electric damper 210. As the first damper link 2121 is rotated, the second damper link 2122 connected to the first damper link 2121 may be moved. As the second damper link 2122 is moved, the carrier 120 connected to the second damper link 2122 may be moved.

The carrier 120 may be moved by the impact of a road surface. As the carrier 120 is moved, the second damper link 2122 connected to the carrier 120 may be moved. As the second damper link 2122 is moved, the first damper link 2121 connected to the second damper link 2122 may be rotated with respect to the electric damper 210. The electric damper 210 can prevent the rotation of the first damper link 2121 or reduce the rotational speed thereof by operating in a direction opposite to the direction in which the first damper link 2121 is rotated.

The controller 30 may be supplied with power from the low voltage battery 40. The controller 30 may be supplied with power from the high voltage battery 50. The controller 30 may be supplied with power from the low voltage battery 40 and the high voltage battery 50.

The controller 30 may be supplied with power from the low voltage battery 40. Although a vehicle travels or does not travel (e.g., the state in which the vehicle has been turned off), the controller 30 may be supplied with power from the low voltage battery 40. The controller 30 may be supplied with power from the low voltage battery 40, and may supply the power to the damper 20. The damper 20 that has been supplied with power through the low voltage battery 40 and the controller 30 may supply the power to the encoder 211.

Although a vehicle travels or does not travel, the damper 20 that is supplied with power through the low voltage battery 40 and the controller 30 may transmit a signal to the controller 30. The signal that is transmitted from the damper 20 to the controller 30 may include a signal relating to a value that is detected by the encoder 211 with respect to the electric damper 210. According to an embodiment, signals relating to a rotational speed or rotation angle of the electric damper 210, a variance of the rotational speed and/or a variance of the rotation angle, which are detected by the encoder 211, or information on the location of the carrier 120 with respect to the frame 110 may be transmitted from the damper 20 to the controller 30.

The controller 30 may calculate signals relating to the rotational speed, the rotation angle, the variance of the rotational speed and/or the variance of the rotation angle, which are received from the damper 20, in order to estimate information on the location of the carrier 120 with respect to the frame 110. Alternatively, the controller 30 may receive, from the damper 20, the signal relating to the information on the location of the carrier 120 with respect to the frame 110.

Although a vehicle travels or does not travel as described above, the controller 30 may retain information on the location of the carrier 120 with respect to the frame 110. The controller 30 may calculate the height of a vehicle (e.g., a vehicle height) from the ground based on the information on the location of the carrier 120 with respect to the frame 110.

The controller 30 may receive a plurality of signals or information on the location of the carrier 120 with respect to the frame 110 from the plurality of dampers 20, and may calculate the height of a vehicle (e.g., a vehicle height) by synthesizing the plurality of signals and the information on the location.

The controller 30 may estimate a form (e.g., a slope, a paved road, or an unpaved road) of a terrain in which a vehicle is disposed, by calculating information that is received through the encoder 211 of the plurality of dampers 20. According to an embodiment, when receiving irregular signals from the plurality of dampers 20, the controller 30 may determine that a vehicle travels on an unpaved road. In this case, the controller 30 may increase or decrease the damping force of the damper 20.

The controller 30 may be supplied with power from the high voltage battery 50. The controller 30 may be supplied power from the high voltage battery 50, and may supply the power to the damper 20. The damper 20 that has been supplied with power through the high voltage battery 50 and the controller 30 may drive the electric damper 210.

The electric damper 210 may rotate the damper link part 212 by the power that is supplied through the high voltage battery 50 and the controller 30. The controller 30 may adjust the rotational speed and/or rotation angle of the damper link part 212 by controlling the driving of the electric damper 210.

As the controller 30 adjusts the rotational speed of the damper link part 212, the damping force of the damper 20 may be adjusted.

As the controller 30 adjusts the rotation angle of the damper link part 212, the height of the vehicle may be adjusted because the location of the carrier 120 with respect to the frame 110 is adjusted.

The controller 30 may adjust the damping forces of the plurality of dampers 20. The controller 30 may independently adjust the damping forces of the plurality of dampers 20. As the controller 30 independently adjusts the damping forces of the plurality of dampers 20 as described above, a stabilizer function can be performed.

A stabilizer bar that is mounted on the existing vehicle is a component that moves two carriers 120 so that the two carriers 120 are disposed at the same location or similar locations through the distortion (e.g., torque) of the stabilizer bar that is moved based on the locations of the two carriers 120, when the two carriers 120 disposed in the same vehicle axis are disposed at different locations with respect to the frame 110. As the two carriers 120 are moved so that the two carriers 120 are disposed at the same location or similar locations as described above, the tilting or rolling of a vehicle can be minimized. Moreover, the inclination of the vehicle can be minimized. Accordingly, a driver can steer the vehicle more accurately.

The function of the stabilizer bar may be implemented through the controller 30 that controls the dampers 20 that are independently driven.

According to an embodiment, a first carrier 120, that is, one of the plurality of carriers 120, may behave differently from another carrier 120 of the plurality of carriers 120. In this case, the damper 20 connected to the first carrier 120 may behave differently from the damper 20 connected to the another carrier 120.

The controller 30 may receive signals relating to information on the locations of the plurality of dampers 20. The controller 30 may determine such a situation to be a situation in which the stabilizer function is required. The controller 30 may control the plurality of dampers 20 to operate in order to suppress the inclination of a vehicle, based on the situation being determined to be the situation in which the stabilizer function is required by the controller 30.

The controller 30 may control the rotation angle of one damper 20 to follow the rotation angle of another damper 20. According to an embodiment, the controller 30 may control the driving of the first damper 20-1 so that the rotation angle of the first damper 20-1 follows the rotation angle of the second damper 20-2. Alternatively, the controller 30 may control the driving of the second damper 20-2 so that the rotation angle of the second damper 20-2 follows the rotation angle of the first damper 20-1.

Alternatively, if the rotation angle of the first damper 20-1 is different from the rotation angle of the second damper 20-2, the controller 30 may control the driving of the first damper 20-1 and the second damper 20-2 so that the rotation angle of the first damper 20-1 and the rotation angle of the second damper 20-2 follow an average value of the rotation angle of the first damper 20-1 and the rotation angle of the second damper 20-2.

The controller 30 may reduce a difference between a relative location of the first carrier 120-1 with respect to the frame 110 and a relative location of the second carrier 120-2 with respect to the frame 110 by controlling the driving of the first damper 20-1 and the second damper 20-2.

The controller 30 may receive information of the first damper 20-1 and the second damper 20-2 from the first damper 20-1 and the second damper 20-2. The information of the first damper 20-1 and the second damper 20-2 may include information on the height of the first carrier 120-1 and the height of the second carrier 120-2 with respect to the frame 110.

The controller 30 may maintain a difference between the height of the first carrier 120-1 and the height of the second carrier 120-2 with respect to the frame 110 within a predetermined range by controlling the driving of the first damper 20-1 and the second damper 20-2. The predetermined range may be approximately 20 cm or less. The predetermined range may be different depending on the design.

Alternatively, the controller 30 may control a relative location of the first carrier 120 with respect to the frame 110 and a relative location of the second carrier 120 with respect to the frame 110 so that the relative location of the first carrier 120 and the relative location of the second carrier 120 correspond to each other, through the driving of the first damper 20-1 and the second damper 20-2.

Accordingly, the suspension apparatus 1 may implement the stabilizer function through the damper 20.

The stabilizer function may be differently adjusted depending on the size or attenuation characteristic of a damping force that is input to the controller 30.

The controller 30 may independently control the driving of two dampers 20 connected to the front wheels of a vehicle, may independently control the driving of two dampers 20 connected to the rear wheels of the vehicle, or may independently control the driving of the four dampers 20 connected to the front wheels and the rear wheels.

The stabilizer function can be implemented although the stabilizer bar is not mounted on a vehicle through the controller 30 that controls the plurality of dampers 20 that independently operates, as described above.

Alternatively, the controller 30 may dispose a vehicle in a specific form by controlling the driving of the damper 20.

According to an embodiment, the controller 30 may dispose a vehicle that is disposed on a slope to be close to the horizontal, by controlling the driving of the damper 20.

According to another embodiment, when a person gets on or gets off a vehicle, the controller 30 may adjust the height of the vehicle by controlling the driving of the damper 20.

For example, if the height of a vehicle is relatively high, the controller 30 may lower the height of the vehicle by controlling the driving of the damper 20, thus providing convenience to a person when the person gets on or gets off the vehicle.

Alternatively, if the height of the vehicle is relatively low, the controller 30 may raise the height of the vehicle by controlling the driving of the damper 20, thus providing convenience to a person when the person gets on or gets off the vehicle.

Figure 6:
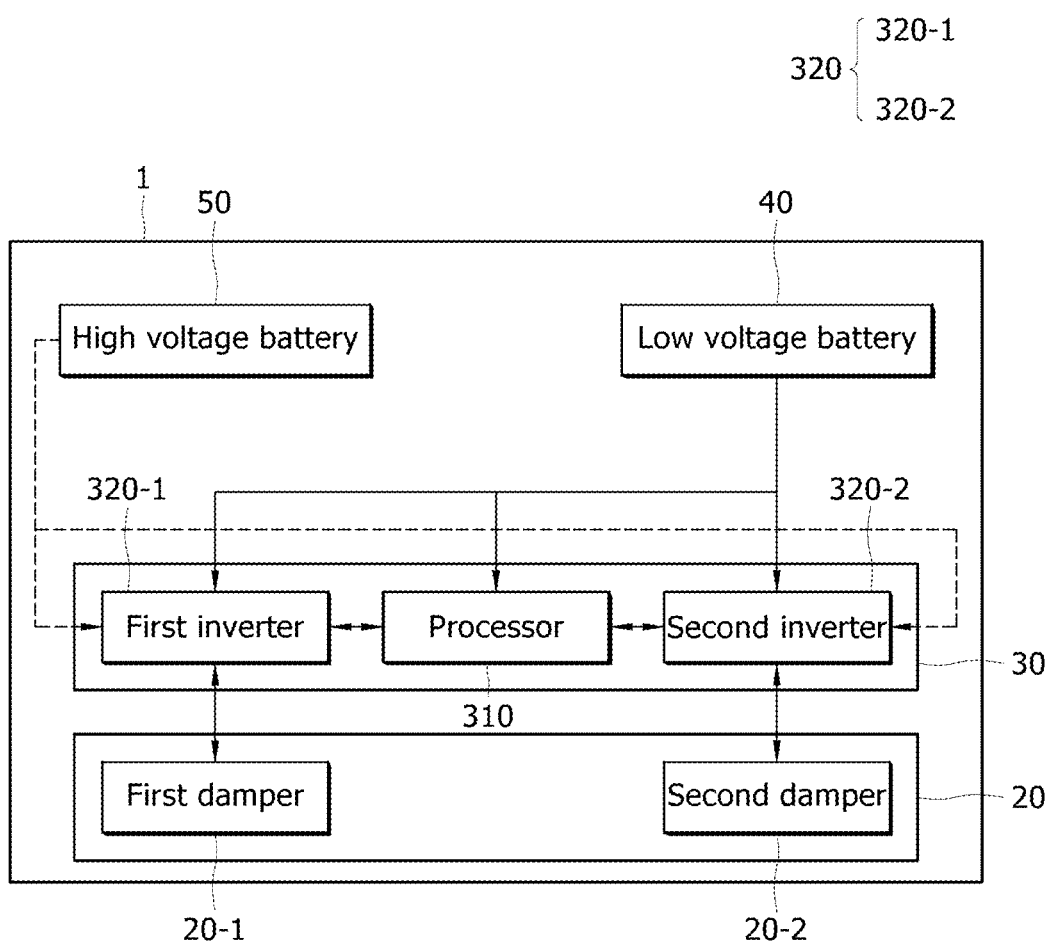
FIG. 6 is a block diagram of a first embodiment of a controller of the suspension apparatus according to an embodiment of the present disclosure.
Figure 7:
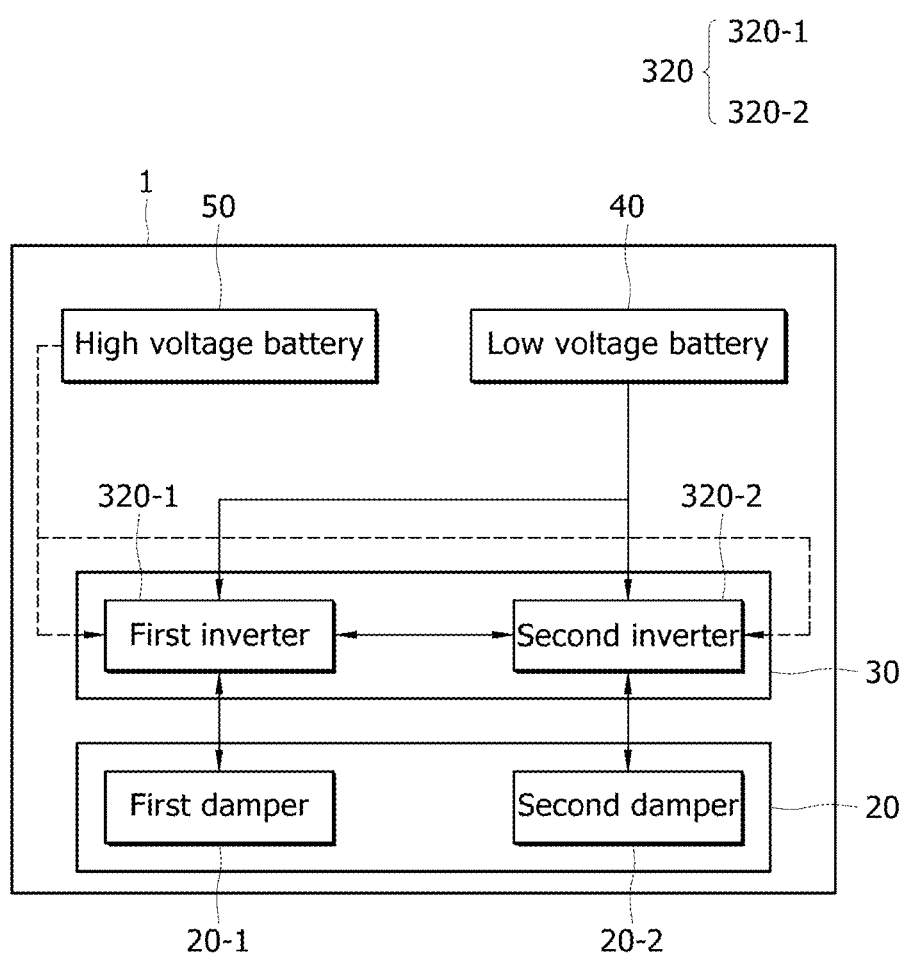
FIG. 7 is a block diagram of a second embodiment of the controller of the suspension apparatus according to an embodiment of the present disclosure.

FIG. 6 is a block diagram of a first embodiment of the controller of the suspension apparatus according to an embodiment of the present disclosure. FIG. 7 is a block diagram of a second embodiment of the controller of the suspension apparatus according to an embodiment of the present disclosure.

The suspension apparatus 1, the damper 20, the low voltage battery 40, and the high voltage battery 50 illustrated in FIGS. 6 and 7 are the same as the suspension apparatus 1, the damper 20, the low voltage battery 40, and the high voltage battery 50 illustrated in FIGS. 1 to 5, respectively. Accordingly, a description of the same component may be omitted.

A controller 30 illustrated in FIG. 6 is the first embodiment of the controller 30 according to an embodiment of the present disclosure, and may include a processor 310 and an inverter 320.

Referring to FIG. 6, the controller 30 may include the processor 310, a first inverter 320-1, and a second inverter 320-2.

The low voltage battery 40 may supply power to the processor 310, the first inverter 320-1, and the second inverter 320-2. The first inverter 320-1 and the second inverter 320-2 may supply the first damper 20-1 and the second damper 20-2 with the power that is supplied by the low voltage battery 40. The power that is supplied from the low voltage battery 40 to the first damper 20-1 and the second damper 20-2 through the first inverter 320-1 and the second inverter 320-2 may also be supplied to the first encoder 211-1 and the second encoder 211-2.

Each of the first encoder 211-1 and the second encoder 211-2 may detect a rotational speed, a rotation angle, a variance of the rotational speed and/or a variance of the rotation angle from each of the first electric damper 210-1 and the second electric damper 210-2. Signals relating to the detected values of the first encoder 211-1 and the second encoder 211-2 may be transmitted to the first inverter 320-1 and the second inverter 320-2.

Each of the first inverter 320-1 and the second inverter 320-2 may transmit, to the processor 310, the signal that is received from each of the first encoder 211-1 and the second encoder 211-2. The processor 310 may calculate a form in which a vehicle has been disposed and the height of the vehicle by receiving signals of the plurality of dampers 20.

The low voltage battery 40 may supply power to the processor 310, the first inverter 320-1, and the second inverter 320-2 even in the state in which a vehicle does not travel (e.g., the state in which the vehicle has been turned off). As the first inverter 320-1 and the second inverter 320-2 supply power to the first damper 20-1 and the second damper 20-2, the processor 310 may receive a signal that is detected with respect to the damper 20 in the state in which the vehicle has been turned off, and may calculate a form in which the vehicle has been disposed and the height of the vehicle based on the received signal.

The high voltage battery 50 may supply power to the first inverter 320-1 and the second inverter 320-2. The power that is supplied from the high voltage battery 50 to the first inverter 320-1 and the second inverter 320-2 may be supplied to the first damper 20-1 and the second damper 20-2.

The processor 310 may control the operation of the first inverter 320-1 and the second inverter 320-2. The first inverter 320-1 and the second inverter 320-2 may adjust the power of the high voltage battery 50 that is supplied to the first damper 20-1 and the second damper 20-2, under the control of the processor 310.

As the power of the high voltage battery 50 that is supplied from the first inverter 320-1 and the second inverter 320-2 to the first damper 20-1 and the second damper 20-2 is adjusted, the first damper 20-1 and the second damper 20-2 may be driven by control of the processor 310.

As the first damper 20-1 and the second damper 20-2 are driven by control of the processor 310, the height of the vehicle may be adjusted or the stabilizer function may be performed.

It has been illustrated in FIG. 6 that the controller 30 includes two inverters (i.e., the first inverter 320-1 and the second inverter 320-2). However, the controller 30 may include two or more inverters 320.

A controller 30 illustrated in FIG. 7 is the second embodiment of the controller 30 according to an embodiment of the present disclosure, and may include an inverter 320.

In the controller 30 illustrated in FIG. 7, any one of the first inverter 320-1 or the second inverter 320-2 may perform the function of the processor 310. The inverter 320 that performs the function of the processor 310 may operate as a master inverter, and the inverter 320 that does not perform the function of the processor 310 may operate as a slave inverter that operates under the control of the master inverter.

According to an embodiment, the first inverter 320-1 may operate as a master inverter, and the second inverter 320-2 may operate as a slave inverter.

According to another embodiment, the second inverter 320-2 may operate as a master inverter, and the first inverter 320-1 may operate as a slave inverter.

Hereinafter, an embodiment in which the first inverter 320-1 operates as a master inverter and the second inverter 320-2 operates as a slave inverter is described.

The low voltage battery 40 may supply power to the first inverter 320-1 and the second inverter 320-2. The first inverter 320-1 and the second inverter 320-2 may supply the first damper 20-1 and the second damper 20-2, respectively, with the power that is supplied by the low voltage battery 40. The power that is supplied from the low voltage battery 40 to the first damper 20-1 and the second damper 20-2 through the first inverter 320-1 and the second inverter 320-2 may also be supplied to the first encoder 211-1 and the second encoder 211-2.

Each of the first encoder 211-1 and the second encoder 211-2 may detect a rotational speed, a rotation angle, a variance of the rotational speed and/or a variance of the rotation angle from each of the first electric damper 210-1 and the second electric damper 210-2. Signals relating to the detected values of the first encoder 211-1 and the second encoder 211-2 may be transmitted the first inverter 320-1 and the second inverter 320-2.

The second inverter 320-2 may transmit, to the first inverter 320-1, the signal that is received from the second encoder 211-2. The first inverter 320-1 may calculate a form in which a vehicle has been disposed and the height of the vehicle by receiving the signals of the plurality of dampers 20.

The low voltage battery 40 may supply power to the first inverter 320-1 and the second inverter 320-2 even in the state in which a vehicle does not travel (e.g., the state in which the vehicle has been turned off). As the first inverter 320-1 and the second inverter 320-2 supply power to the first damper 20-1 and the second damper 20-2, the first inverter 320-1 may receive a signal that is detected with respect to the damper 20 even in the state in which the vehicle has been turned off, and may calculate the form in which the vehicle has been disposed and the height of the vehicle based on the received signal.

The high voltage battery 50 may supply power to the first inverter 320-1 and the second inverter 320-2. The power that is supplied from the high voltage battery 50 to the first inverter 320-1 and the second inverter 320-2 may be supplied to the first damper 20-1 and the second damper 20-2.

The first inverter 320-1 may control the operation of the second inverter 320-2. The first inverter 320-1 and the second inverter 320-2 that is controlled by the first inverter 320-1 may adjust power of the high voltage battery 50 that is supplied to the first damper 20-1 and the second damper 20-2.

As the power of the high voltage battery 50 that is supplied from the first inverter 320-1 and the second inverter 320-2 to the first damper 20-1 and the second damper 20-2 is adjusted, the first damper 20-1 and the second damper 20-2 may be driven by control of the first inverter 320-1.

As the first damper 20-1 and the second damper 20-2 are driven by control of the first inverter 320-1, the height of the vehicle may be adjusted or the stabilizer function may be performed.

It has been illustrated in FIG. 7 that the controller 30 includes two inverters (i.e., the first inverter 320-1 and the second inverter 320-2). However, the controller 30 may include two or more inverters 320.

Figure 8:
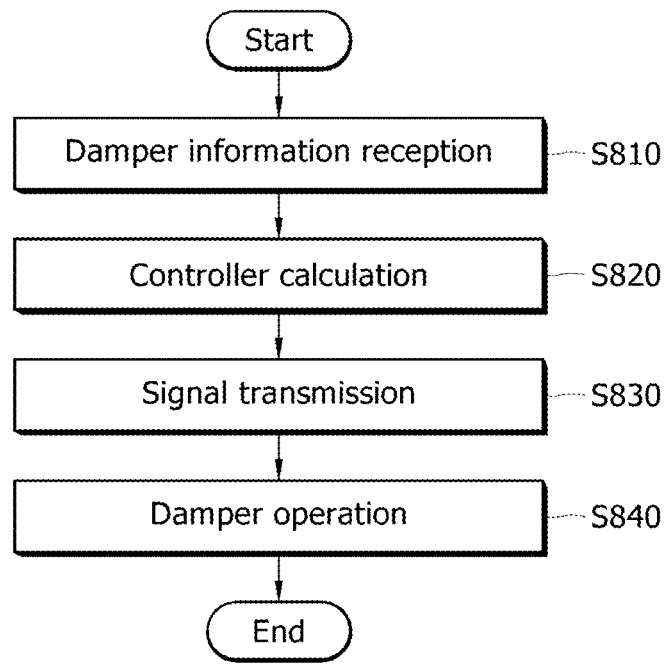
FIG. 8 is a flowchart of a first embodiment of a method of controlling a suspension apparatus according to an embodiment of the present disclosure.

FIG. 8 is a flowchart of a first embodiment of a method of controlling a suspension apparatus according to an embodiment of the present disclosure.

The method of controlling a suspension apparatus, which is illustrated in FIG. 8, is a method of controlling the components of the suspension apparatus 1 described with reference to FIGS. 1 to 7. Accordingly, a description of the components of the suspension apparatus 1 may be omitted.

Hereinafter, the method of controlling a suspension apparatus that controls the driving of the damper 20 through the controller 30 is described.

The controller 30 may adjust the height of a vehicle, may implement the stabilizer function, or may adjust the damping force of the damper 20 by controlling the driving of the damper 20, through the method of controlling a suspension apparatus.

The low voltage battery 40 may supply power to the controller 30, and may supply power to the damper 20 through the controller 30. The low voltage battery 40 may supply power to the processor 310 and inverter 320 of the controller 30 and the encoder 211 of the damper 20.

The high voltage battery 50 may supply power to the controller 30, and may supply power to the damper 20 through the controller 30. The high voltage battery 50 may supply power to the inverter 320 of the controller 30 and the electric damper 210 of the damper 20.

The method of controlling a suspension apparatus may include a damper information reception step (S810 in FIG. 8) of receiving information of the damper 20, a controller calculation step (S820 in FIG. 8) of calculating a control value for the damper 20 based on the received information of the damper 20, a signal transmission step (S830 in FIG. 8) of transmitting the calculated control value to the damper 20, and a damper operation step (S840 in FIG. 8) of operating the damper 20 based on the control value.

The damper information reception step S810 may include a step of detecting, by the encoder 211, information on a rotational speed or rotation angle of the electric damper 210 of the damper 20, a variance of the rotational speed and/or a variance of the rotation angle. According to an embodiment, the first encoder 211-1 may detect a rotational speed or rotation angle of the first electric damper 210-1, a variance of the rotational speed and/or a variance of the rotation angle. The second encoder 211-2 may detect a rotational speed or rotation angle of the second electric damper 210-2, a variance of the rotational speed and/or a variance of the rotation angle.

The damper information reception step S810 may include a step of transmitting, by the encoder 211, the detected information of the electric damper 210 to the controller 30. The inverter 320 that is included in the controller 30 may receive the information of the electric damper 210 from the encoder 211.

In the case of an embodiment in which the controller 30 includes the processor 310, the processor 310 may receive the information of the electric damper 210 from the inverter 320. The processor 310 may receive information of a plurality of dampers 20 from a plurality of dampers 320. According to an embodiment, the processor 310 may receive information of the first damper 20-1 and the second damper 20-2 from the first inverter 320-1 and the second inverter 320-2.

In another embodiment in which the controller 30 includes the processor 310, the inverter 320 may receive information of the electric damper 210. According to an embodiment, the first inverter 320-1 and the second inverter 320-2 may receive information of the first damper 20-1 and the second damper 20-2.

The first inverter 320-1 that performs the function of a master inverter may receive information of the first damper 20-1, and may receive information of the second damper 20-2 from the second inverter 320-2 that performs the function of a slave inverter.

The controller calculation step S820 may include a step of calculating a control value for the damper 20 by calculating the information of the damper 20. The processor 310 or the first inverter 320-1 that performs the function of the master inverter may calculate the information of the damper 20.

The controller calculation step S820 may include a step of comparing, by the controller 30, a difference between the rotational speeds or rotation angles of the plurality of dampers 20, variances of the rotational speeds and/or variances of the rotation angles.

The controller calculation step S820 may include a step of generating, by the processor 310 or the first inverter 320-1 that performs the function of the master inverter, a control value for the driving of the damper 20 in order to adjust the damping force of the damper 20, adjust the height of the vehicle body, or perform the stabilizer function, by synthesizing the information of the damper 20. The processor 310 may generate the control value that controls the first damper 20-1 and the second damper 20-2 so that the rolling phenomenon of the vehicle is reduced, by calculating roll stiffness torque of the vehicle.

The controller calculation step S820 may include a step of generating, by the first inverter 320-1 and/or the second inverter 320-2, the control value for the driving of the first damper 20-1 and/or the second damper 20-2 in order to perform a function for adjusting the damping forces of the first damper 20-1 and/or the second damper 20-2 based on the information of the first damper 20-1 and/or the second damper 20-2.

The signal transmission step S830 may include a step of transmitting, by the processor 310, the control value that is generated through the first inverter 320-1 and/or the second inverter 320-2 to the first damper 20-1 and/or the second damper 20-2.

The signal transmission step S830 may include a step of transmitting, by the first inverter 320-1 that performs the function of the master inverter, the generated control value to the first damper 20-1.

The signal transmission step S830 may include a step of transmitting, by the first inverter 320-1 that performs the function of the master inverter, a control value that is generated through the second inverter 320-2 that performs the function of the slave inverter to the second damper 20-2.

The signal transmission step S830 may include a step of transmitting, by the first inverter 320-1 and/or the second inverter 320-2, the generated control value to the first damper 20-1 and/or the second damper 20-2.

The damper operation step S840 may include a step of operating the damper 20 based on the received control value.

The damper operation step S840 may include a step of operating the first damper 20-1 and/or the second damper 20-2 based on the control value that is received from the first inverter 320-1 and/or the second inverter 320-2.

The damper operation step S840 may include a step of adjusting the location of the first carrier 120-1 and/or the second carrier 120-2 with respect to the frame 110 through an operation of the first damper 20-1 and/or the second damper 20-2.

The damper 20 may operate so that the location of the first carrier 120-1 and/or the second carrier 120-2 with respect to the frame 110 is not changed, and may operate so that the location of the first carrier 120-1 and/or the second carrier 120-2 is slowly rotated with respect to the frame 110.

The first damper 20-1 may operate so that the first carrier 120-1 follows a movement of the second carrier 120-2.

The second damper 20-2 may operate so that the second carrier 120-2 follows a movement of the first carrier 120-1.

The suspension apparatus 1 may perform the damping function and may perform the stabilizer function through the method of controlling a suspension apparatus.

Figure 9:
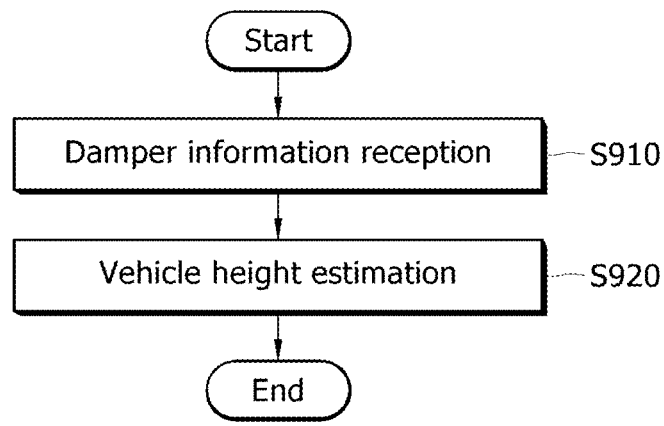
FIG. 9 is a flowchart of a second embodiment of the method of controlling a suspension apparatus according to an embodiment of the present disclosure.

FIG. 9 is a flowchart of a second embodiment of the method of controlling a suspension apparatus according to an embodiment of the present disclosure.

The method of controlling a suspension apparatus, which is illustrated in FIG. 9, is a method of controlling the components of the suspension apparatus 1 that have been described with reference to FIGS. 1 to 7. Accordingly, a description of the components of the suspension apparatus 1 may be omitted.

Hereinafter, the method of controlling a suspension apparatus that controls the driving of the damper 20 through the controller 30 is described.

The controller 30 may estimate the height of a vehicle even in the state in which the vehicle has been turned off, through the method of controlling a suspension apparatus.

The method of controlling a suspension apparatus may include a damper information reception step (S910 in FIG. 9) of receiving information on the damper 20 and a vehicle height estimation step (S920 in FIG. 9) of estimating the height of a vehicle based on the information on the damper 20.

The low voltage battery 40 may supply power to the controller 30, and may supply power to the damper 20 through the controller 30. The low voltage battery 40 may supply power to the processor 310 and inverter 320 of the controller 30 and the encoder 211 of the damper 20.

The damper information reception step S910 may include a step of detecting, by the encoder 211, information on a rotational speed or rotation angle of the electric damper 210 of the damper 20, a variance of the rotational speed and/or a variance of the rotation angle. Accordingly, information of the first damper 20-1 and the second damper 20-2 may include signals relating to rotational speeds and rotation angles of the first electric damper 210-1 and the second electric damper 220-1, variances of the rotational speeds and/or variances of the rotation angles.

The damper information reception step S910 may include a step of transmitting, by the encoder 211, the detected information on the electric damper 210 to the controller 30. The inverter 320 that is included in the controller 30 may receive the information of the electric damper 210 from the encoder 211.

In the case of an embodiment in which the controller 30 includes the processor 310, the processor 310 may receive information of the electric damper 210 from the inverter 320. The processor 310 may receive information of a plurality of dampers 20 from a plurality of inverters 320. According to an embodiment, the processor 310 may receive information of the first damper 20-1 and the second damper 20-2 from the first inverter 320-1 and the second inverter 320-2.

The first inverter 320-1 that performs the function of a master inverter may receive the information of the first damper 20-1, and may receive the information of the second damper 20-2 from the second inverter 320-2 that performs the function of a slave inverter.

The vehicle height estimation step S920 may include a step of estimating, by the controller 30, the height of the vehicle by calculating the information on the rotational speeds or rotation angles of the first damper 20-1 and the second damper 20-2, the variances of the rotational speeds and/or the variances of the rotation angles.

The vehicle height estimation step S920 may include a step of estimating, by the processor 310 included in the controller 30, the height of the vehicle.

The vehicle height estimation step S920 may include a step of estimating, by the first inverter 320-1 that performs the function of the master inverter included in the controller 30, the height of the vehicle.

The suspension apparatus 1 can estimate the height of the vehicle through the method of controlling a suspension apparatus.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A suspension apparatus comprising:
   a frame;
   a first carrier and a second carrier connected to the frame and moved with respect to the frame;
   a first damper disposed in the frame and driven in response to the movement of the first carrier;
   a second damper disposed in the frame and driven in response to the movement of the second carrier; and
   a controller configured to control the driving of the first damper and the second damper so that a difference between a height of the first carrier and a height of the second carrier with respect to the frame is maintained within a set range;
wherein the controller controls each of the first damper and the second damper to generate rotational power in a direction opposite to a movement direction of each of the first carrier and the second carrier.

2. The suspension apparatus as claimed in claim 1, further comprising:
a high voltage battery configured to supply power to the controller, the first damper, and the second damper; and
a low voltage battery configured to supply power to the controller,
wherein a voltage of the high voltage battery is formed to be higher than a voltage of the low voltage battery.

3. The suspension apparatus as claimed in claim 2, wherein the controller comprises:
a first inverter configured to adjust the power that is supplied to the first damper;
a second inverter configured to adjust the power that is supplied to the second damper; and
a processor configured to control a driving of the first inverter and the second inverter.

4. The suspension apparatus as claimed in claim 2, wherein the controller comprises:
a first inverter configured to adjust the power that is supplied to the first damper; and
a second inverter configured to adjust the power that is supplied to the second damper,
wherein the first inverter controls a driving of the second inverter.

5. The suspension apparatus as claimed in claim 1, wherein:
the first damper comprises a first electric damper configured to be driven so that the first carrier is moved and a first encoder configured to detect information on the first electric damper, and
the second damper comprises a second electric damper configured to be driven so that the second carrier is moved and a second encoder configured to detect information on the second electric damper.

6. The suspension apparatus as claimed in claim 5, wherein the controller controls the driving of the first damper and the second damper based on the information that is detected by the first encoder and the second encoder.

7. A suspension apparatus comprising:
a frame;
a first carrier connected to the frame and moved with respect to the frame;
a first damper disposed in the frame and driven in response to the movement of the first carrier;
a controller configured to receive information on a relative location of the first carrier with respect to the frame from the first damper; and
a low voltage battery configured to supply power to the first damper through the controller;
wherein the first damper comprises:
a first electric damper configured to be driven so that the first carrier is moved, and
a first encoder configured to detect the information on the first electric damper.

8. The suspension apparatus as claimed in claim 7, wherein the controller comprises:
a processor configured to be supplied with power from the low voltage battery, and
a first inverter configured to be supplied with power from the low voltage battery and to supply the power to the first damper.

9. The suspension apparatus as claimed in claim 8, wherein:
the first inverter receives the information from the first damper and transmits the information to the processor, and
the processor calculates a height of a vehicle in order to estimate the height based on the information.

10. The suspension apparatus as claimed in claim 7, wherein the controller comprises a first inverter configured to be supplied with power from the low voltage battery and to supply the power to the first damper.

11. The suspension apparatus as claimed in claim 10, wherein the first inverter receives the information from the first damper and calculates a height of a vehicle in order to estimate the height based on the information.

12. The suspension apparatus as claimed in claim 7, further comprising:
a second carrier connected to the frame and moved with respect to the frame; and
a second damper disposed in the frame and driven in response to the movement of the second carrier,
wherein the controller receives information on a relative location of the second carrier with respect to the frame from the second damper, and
the low voltage battery supplies the power to the first damper through the controller.

13. A suspension apparatus comprising:
a frame;
a first carrier and a second carrier connected to the frame and moved with respect to the frame;
a first damper disposed in the frame and driven in response to the movement of the first carrier;
a second damper disposed in the frame and driven in response to the movement of the second carrier;
a controller configured to receive information on a relative location of each of the first carrier and the second carrier with respect to the frame from each of the first damper and the second damper; and
a low voltage battery configured to supply power to the first damper and the second damper through the controller;
wherein the controller controls each of the first damper and the second damper to generate rotational power in a direction opposite to a movement direction of each of the first carrier and the second carrier.

14. The suspension apparatus as claimed in claim 13, wherein the controller controls the driving of the first damper and the driving of the second damper so that a difference between a height of the first carrier and a height of the second carrier with respect to the frame is maintained within a set range.

15. The suspension apparatus as claimed in claim 14, further comprising a high voltage battery configured to supply power to the first damper and the second damper through the controller,
wherein a voltage of the high voltage battery is formed to be higher than a voltage of the low voltage battery.

16. The suspension apparatus as claimed in claim 15, wherein the controller controls the first damper and the second damper to be independently driven.

17. The suspension apparatus as claimed in claim 15, wherein:

the first damper comprises a first electric damper configured to be driven so that the first carrier is moved and a first encoder configured to detect information on the first electric damper, and the second damper comprises a second electric damper configured to be driven so that the second carrier is moved and a second encoder configured to detect information on the second electric damper.

18. The suspension apparatus as claimed in claim 13, wherein the controller comprises:

a first inverter configured to adjust the power that is supplied to the first damper;

a second inverter configured to adjust the power that is supplied to the second damper; and a processor configured to control the driving of the first inverter and the second inverter.

\* \* \* \* \*